(12) United States Patent
Nonaka et al.

(10) Patent No.: US 9,311,361 B1
(45) Date of Patent: Apr. 12, 2016

(54) ALGORITHMICALLY DETERMINING THE VISUAL APPEAL OF ONLINE CONTENT

(71) Applicant: Google Inc., Mountain View, CA (US)

(72) Inventors: Ayaka Nonaka, Mountain View, CA (US); Daly Chang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 234 days.

(21) Appl. No.: 13/839,305

(22) Filed: Mar. 15, 2013

(51) Int. Cl.
G06F 7/00 (2006.01)
G06F 17/30 (2006.01)

(52) U.S. Cl.
CPC .................................. G06F 17/3053 (2013.01)

(58) Field of Classification Search
None
See application file for complete search history.

(56) References Cited

U.S. PATENT DOCUMENTS

| | | |
|---|---|---|
| 7,409,635 B2 | 8/2008 | Epstein |
| 7,765,470 B2 | 7/2010 | Epstein |
| 8,160,925 B2 | 4/2012 | Anand et al. |
| 8,165,915 B1 | 4/2012 | Lucash |
| 8,260,846 B2 | 9/2012 | Lahav |
| 2003/0059121 A1* | 3/2003 | Savakis et al. ............... 382/239 |
| 2006/0149622 A1* | 7/2006 | Baluja et al. .................. 705/14 |
| 2007/0130126 A1* | 6/2007 | Lucovsky et al. ............. 707/3 |
| 2007/0150368 A1 | 6/2007 | Arora et al. |
| 2008/0140476 A1 | 6/2008 | Anand et al. |
| 2008/0140508 A1 | 6/2008 | Anand et al. |
| 2009/0006387 A1* | 1/2009 | Tunkelang et al. ............. 707/5 |
| 2009/0106113 A1* | 4/2009 | Arora .................... G06Q 30/02 705/14.53 |
| 2010/0023475 A1 | 1/2010 | Lahav |
| 2010/0063876 A1 | 3/2010 | Godden et al. |
| 2010/0088605 A1* | 4/2010 | Livshin ................ G06F 17/212 715/731 |
| 2010/0185507 A1 | 7/2010 | Tokuda |
| 2010/0241515 A1 | 9/2010 | Katti |
| 2011/0246406 A1 | 10/2011 | Lahav et al. |
| 2012/0089499 A1* | 4/2012 | Balthaser ............. G06F 17/254 705/35 |
| 2014/0250110 A1* | 9/2014 | Yang ................ G06F 17/30867 707/723 |

OTHER PUBLICATIONS

Henschel et al., Automatic Genre-Driven Layout Generation, In: Proceedings of the KONVENS-2002 Conference, Sep. 2002.
Winfried H. Graf, the Constraint-Based Layout Framework LayLab and Its Applications, German Research Center for Artificial Intelligence (DFKI) GmbH, Jan. 29 1996.

* cited by examiner

*Primary Examiner* — Tuan A Pham
(74) *Attorney, Agent, or Firm* — Foley & Lardner LLP; John D. Lanza

(57) ABSTRACT

A system and a computer-implemented method for automatically determining the visual appeal of online content are provided. The method includes storing a plurality of software implemented algorithms in the memory device, receiving one or more generated items of online content, determining graphics and textual content parameters of the received items of online content, comparing the determined parameters to the set of desired parameters, ranking the items of online content based on the comparisons, and outputting the ranked items of online content. Each algorithm includes one or more rules capable of recognizing graphic content parameters, recognizing textual content parameters, and relating the graphic content parameters and the textual content parameters to a set of desired parameters accessible to the rules.

19 Claims, 5 Drawing Sheets

ALGORITHMICALLY DETERMINING THE VISUAL APPEAL OF ONLINE CONTENT

BACKGROUND

This description relates to determining the visual appeal of items of online content and more particularly, to a network-based method and system for automatically determining the visual appeal of online content items.

Online content items can be displayed on webpages. The content items generally include graphic content mixed with textual content that are selected and arranged to create interesting and informative content items that convey the content item provider's message and hopefully succeeds in getting a viewer to respond to the message. The content items are designed by human designers who apply their creative talents, experience, and rules of thumb to create the content item. If content items were able to be created automatically, a designer's knowledge would be needed to verify the quality of the content item. Most users of content item serving systems are not designers and lack an ability to determine the effectiveness or quality of online content items on their own. Hiring a design agency to check quality and effectiveness may be prohibitively expensive for many users. Using known techniques that aid users in checking the design of the content item are based on static templates that do not take into account the various elements of design that may be known by human designers.

BRIEF DESCRIPTION OF THE DISCLOSURE

In one embodiment, a computer-implemented method for automatically determining the visual appeal of online content includes storing a plurality of software implemented algorithms in the memory device, receiving one or more generated items of online content, determining graphics and textual content parameters of the received items of online content, comparing the determined parameters to the set of desired parameters, ranking the items of online content based on the comparisons, and outputting the ranked items of online content. Each algorithm includes one or more rules capable of recognizing graphic content parameters, recognizing textual content parameters, and relating the graphic content parameters and the textual content parameters to a set of desired parameters accessible to the rules.

In another embodiment, a system for algorithmically determining the visual appeal of a content item includes a processor and a computer-readable memory device having encoded thereon computer readable instructions that when executed by the processor cause the processor to store a plurality of software implemented algorithms in the memory device, receive one or more generated online content, determine graphic content parameters and textual content parameters of the received online content, compare the determined parameters to the set of desired parameters, rank the online content based on the comparisons, and output the ranked online content. Each algorithm includes one or more rules capable of recognizing graphic content parameters, recognizing textual content parameters, and combining graphic content parameters and textual content parameters wherein the parameters relate to the appearance of the graphic content and the textual content.

In yet another embodiment, one or more non-transitory computer-readable storage media having computer-executable instructions embodied thereon, wherein when executed by at least one processor, the computer-executable instructions cause the processor to store a plurality of software implemented algorithms in the memory device, receive one or more generated online content, determine graphic content parameters and textual content parameters of the received online content, compare the determined parameters to the set of desired parameters, rank the online content based on the comparisons, and output the ranked online content, where each algorithm includes one or more rules capable of recognizing graphic content parameters, recognizing textual content parameters, and combining graphic content parameters and textual content parameters, the parameters relating to the appearance of the graphic content and the textual content.

In another aspect, a system for algorithmically determining the visual appeal of content items is provided. The system includes means for storing a plurality of software implemented algorithms in a memory device. Each algorithm includes one or more rules capable of recognizing graphic content parameters in a content item, recognizing textual content parameters in the content item, and combining graphic content parameters and textual content parameters. The parameters relate to the appearance of the graphic content and the textual content. The system also includes means for receiving one or more generated online content, and means for determining graphic content parameters and textual content parameters of the received online content. Additionally, the system further includes means for comparing the determined parameters to the set of desired parameters, means for ranking the online content based on the comparisons, and means for outputting the ranked online content.

In another aspect, a system as described above further includes means for determining parameters that relate to the semantics of objects or combinations of objects in the graphic content.

In another aspect, a system as described above further includes means for determining parameters that relate to the semantics of the semantics of the textual content, where semantics include meaning, emotion, feeling, memories.

In another aspect, a system as described above further includes means for comparing the determined parameters to the set of desired parameters that include a definition of incompatible combinations of parameters.

In another aspect, a system as described above further includes means for comparing the determined parameters to the set of desired parameters that include a definition of acceptable combinations of parameters.

In another aspect, a system as described above further includes means for determining a graphic content and textual content location with respect to other graphic content and textual content in the content item, a font type, and a font color in which each of the texts is rendered.

In another aspect, a system as described above further includes means for, based on font palettes, evaluating a fit of the text in the content item using one or more font fitting algorithms.

BRIEF DESCRIPTION OF THE DRAWINGS

FIG. 1 is a diagram depicting an example networked environment.

FIG. 2 is a diagram of an example computing device for designating a content item for subsequent review in accordance with an embodiment.

FIG. 3 is a data flow diagram of a system for automatically determining the visual appeal of online content that may be used in the environment shown in FIG. 1.

FIG. 4 is a flowchart of a method for automatically determining the visual appeal of online content, such as, but not limited to, a content item in accordance with an example embodiment of the present disclosure.

FIG. 5 is a diagram of example computing devices that may be used in the environment shown in FIG. 1.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description illustrates embodiments of the disclosure by way of example and not by way of limitation. It is contemplated that the disclosure has general application to automatically determining the visual appeal of online content items.

The following description refers to the accompanying drawings, in which, in the absence of a contrary representation, the same numbers in different drawings represent similar elements.

The system and algorithms described herein can be used to rate content items, such as advertisements, created by lay users not skilled in design and provide guidance for improving the quality and/or effectiveness of their content item. The system and algorithms may also score any automatically generated layouts and content items based on quality and effectiveness metrics, which may be embodied in determinable parameters of the graphic content and the textual content contained within the content item. The algorithms then may use rules programmed with subject matter expert knowledge to select the content items determined to meet predetermined quality and effectiveness thresholds.

Figure 1:
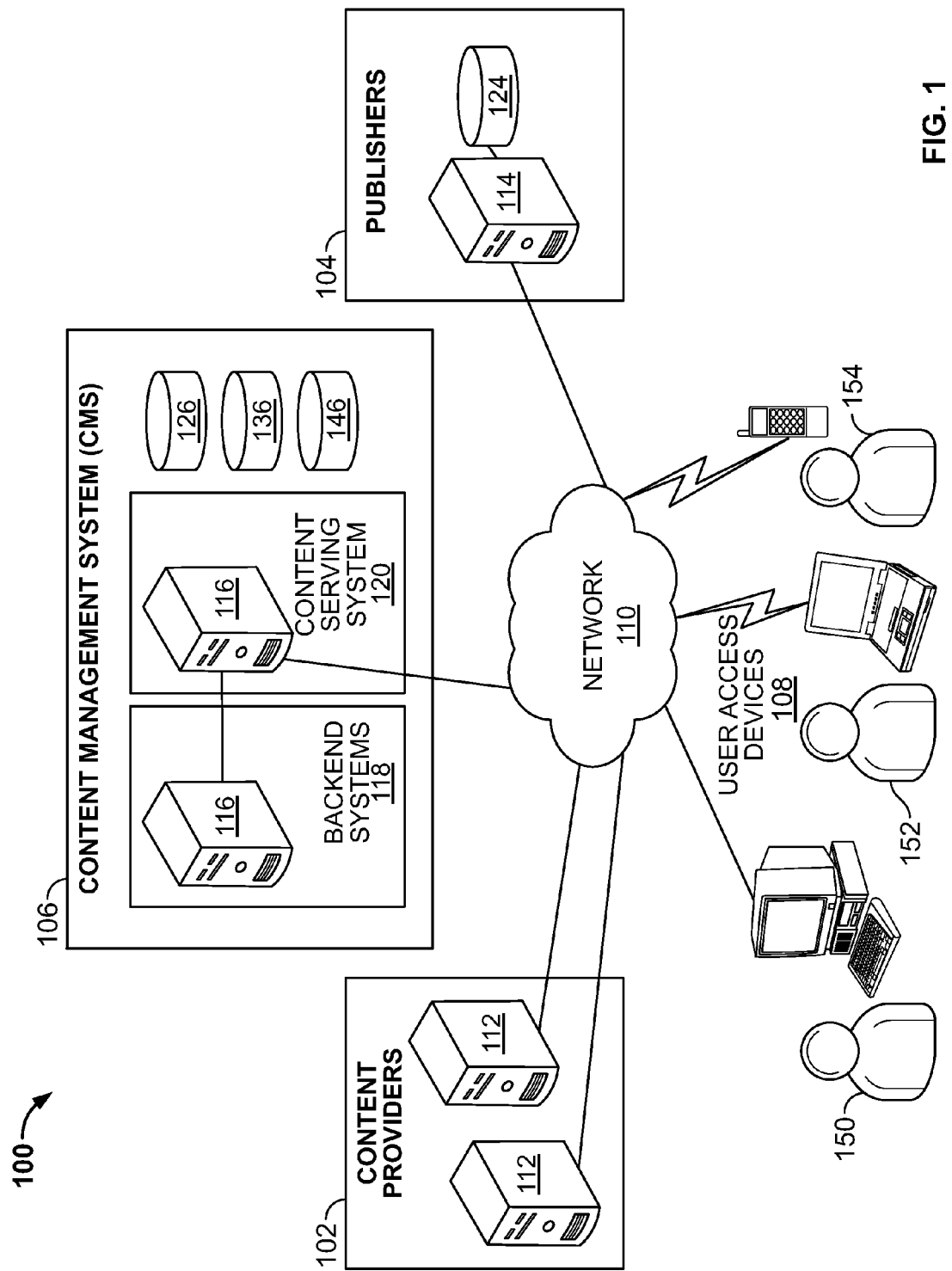
FIGS. 1-5 show example embodiments of the method and system described herein.

FIG. 1 is a diagram depicting an example networked environment. With reference to FIG. 1, an example networked environment 100 may include one or more content providers 102, one or more publishers 104, a content management system (CMS) 106, and one or more user access devices 108, which may be coupled to a network 110. User access devices are used by users 150, 152, and 154. Each of the elements 102, 104, 106, 108 and 110 in FIG. 1 may be implemented or associated with hardware components, software components, or firmware components or any combination of such components. The elements 102, 104, 106, 108 and 110 can, for example, be implemented or associated with general purpose servers, software processes and engines, and/or various embedded systems. The elements 102, 104, 106 and 110 may serve, for example, as a content distribution network.

The content providers 102 may include any entities that are associated with content. In some embodiments, the content includes any form of communication in which one or more products, services, ideas, messages, people, organizations or other items are identified and promoted (or otherwise communicated). Content is not limited to advertisements and commercial promotions. Rather, content may additionally or alternatively include public service announcements or any other types of notices, such as public notices published in printed or electronic press or broadcasts.

Content may be communicated via various mediums and in various forms. In some examples, content may be communicated through an interactive medium, such as the Internet, and may include graphical content (e.g., banner content), textual content, image content, audio content, video content, content combining one of more of any of such components, or any form of electronically delivered content. Content may include embedded information, such as embedded media, links, meta-information, and/or machine executable instructions. Content could also be communicated through RSS (Really Simple Syndication) feeds, radio channels, television channels, print media, and other media.

Content can refer to both a single "creative" and a "content group." A creative refers to any entity that represents one content impression. A content impression refers to any form of presentation of content such that it is viewable/receivable by a user. In some examples, a content impression may occur when content is displayed on a display device of a user access device. A content group refers, for example, to an entity that represents a group of creatives that share a common characteristic, such as having the same content selection and recommendation criteria. Content groups can be used to create a content campaign.

The content providers 102 may provide (or be otherwise associated with) products and/or services related to content. The content providers 102 may include or be associated with, for example, retailers, wholesalers, warehouses, manufacturers, distributors, health care providers, educational establishments, financial establishments, technology providers, energy providers, utility providers, or any other product or service providers or distributors.

The content providers 102 may directly or indirectly generate, maintain, and/or track content, which may be related to products or services offered by or otherwise associated with the content providers 102. The content providers 102 may include or maintain one or more data processing systems 112, such as servers or embedded systems, coupled to the network 110. The content providers 102 may include or maintain one or more processes that run on one or more data processing systems.

The publishers 104 may include any entities that generate, maintain, provide, present and/or otherwise process publications in the environment 100. "Publishers," in particular, include authors of publications, wherein authors may be individual persons, or, in the case of works made for hire, the proprietor(s) who hired the individual(s) responsible for creating the online publications. The term "publication" refers to various types of web-based, software application-based and/or otherwise presented information, including articles, discussion threads, reports, analyses, financial statements, music, video, graphics, search results, web page listings, information feeds (e.g., RSS feeds), television broadcasts, radio broadcasts, printed information, or any other form of information that may be presented to a user using a computing device such as one of user access devices 108.

In some implementations, the publishers 104 may include publishers with an Internet presence, such as online publication and news providers (e.g., online newspapers, online magazines, television websites, etc.), online service providers (e.g., financial service providers, health service providers, etc.), and the like. The publishers 104 can include software application providers, television broadcasters, radio broadcasters, satellite broadcasters, and other providers of publications. One or more of the publishers 104 may represent a publication network that is associated with the CMS 106.

The publishers 104 may receive requests from the user access devices 108 (or other elements in the environment 100) and provide or present publications to the requesting devices. The publishers may provide or present publications via various mediums and in various forms, including web based and non-web based mediums and forms. The publishers 104 may generate and/or maintain such publications and/or retrieve the publications from other network resources.

In addition to publications, the publishers 104 may be configured to integrate or combine retrieved publications with content that is related or relevant to the retrieved publication for display to users 150, 152, and 154. As discussed further below, the relevant content may be provided from the CMS 106 and may be combined with a publication for display to users 150, 152, and 154. In some examples, the publishers 104 may retrieve a publication for display on a particular user access device 108 and then forward the publication to the user access device 108 along with code that causes content from the CMS 106 to be displayed to the user 150, 152, or 154. In other examples, the publishers 104 may retrieve a publication, retrieve relevant content (e.g., from the CMS 106 or the content providers 102), and then integrate the content and the publication to form a page for display to the user 150, 152, or 154.

As noted above, one or more of the publishers 104 may represent a publication network. In such an implementation, the content providers 102 may be able to present content items to users through this publication network.

The publishers 104 may include or maintain one or more data processing systems 114, such as servers or embedded systems, coupled to the network 110. They may include or maintain one or more processes that run on data processing systems. In some examples, the publishers 104 may include one or more publication repositories 124 for storing publications and other information.

The CMS 106 manages content and provides various services to the content providers 102, the publishers 104, and the user access devices 108. The CMS 106 may store content in a content repository 126 and facilitate the distribution or selective provision and recommendation of content through the environment 100 to the user access devices 108. In some configurations, the CMS 106 may include or access functionality associated with the AdWords™, AdSense™, and/or AdMob™ systems provided by Google Inc. (Mountain View, Calif.).

The CMS 106 may include one or more data processing systems 116, such as servers or embedded systems, coupled to the network 110. It can also include one or more processes, such as server processes. In some examples, the CMS 106 may include a content serving system 120 and one or more backend processing systems 118. The content serving system 120 may include one or more data processing systems 116 and may perform functionality associated with delivering content to publishers or user access devices 108. The backend processing systems 118 may include one or more data processing systems 116 and may perform functionality associated with identifying relevant content to deliver, processing various rules, performing filtering processes, generating reports, maintaining accounts and usage information, and other backend system processing. The CMS 106 can use the backend processing systems 118 and the content serving system 120 to selectively recommend and provide relevant content from the content providers 102 through the publishers 104 to the user access devices 108.

The CMS 106 may include or access one or more crawling, indexing and searching modules (not shown). These modules may browse accessible resources (e.g., the World Wide Web, publisher content, data feeds, etc.) to identify, index and store information. The modules may browse information and create copies of the browsed information for subsequent processing. The modules may also check links, validate code, harvest information, and/or perform other maintenance or other tasks.

Searching modules may search information from various resources, such as the World Wide Web, publications, intranets, newsgroups, databases, and/or directories. The search modules may employ one or more known search or other processes to search data. In some implementations, the search modules may index crawled content and/or content received from data feeds to build one or more search indices. The search indices may be used to facilitate rapid retrieval of information relevant to a search query.

The CMS 106 may include one or more interface or frontend modules for providing the various features to content providers, publishers, and user access devices. For example, the CMS 106 may provide one or more publisher front-end interfaces (PFEs) for allowing publishers to interact with the CMS 106. The CMS 106 may also provide one or more content provider front-end interfaces (CPFEs) for allowing content providers to interact with the CMS 106. In some examples, the front-end interfaces may be configured as web applications that provide users with network access to features available in the CMS 106.

The CMS 106 provides various content management features to the content providers 102. In some examples, the CMS 106 may include features for content providers similar to those in the AdWords™ system provided by Google Inc. The CMS 106 features may allow users to set up user accounts, set account preferences, create content, select keywords for content, create campaigns or initiatives for multiple products or businesses, view reports associated with accounts, analyze costs and return on investment, selectively identify customers in different regions, selectively recommend and provide content to particular publishers, analyze financial information, analyze content performance, estimate content traffic, access keyword tools, add graphics and animations to content, etc.

The CMS 106 may allow the content providers 102 to create content and input keywords for which the content will appear. In some examples, the CMS 106 may provide content to user access devices or publishers when keywords associated with that content are included in a user request or a requested publication. The CMS 106 may also allow the content providers 102 to set bids for content. A bid may represent the maximum amount a content provider is willing to pay for each content impression, user click-through of content or other interaction with content. A click-through can include any action a user takes to select content. The content providers 102 may also choose a currency and monthly budget.

The CMS 106 may also allow the content providers 102 to view information about content impressions, which may be maintained by the CMS 106. The CMS 106 may be configured to determine and maintain the number of content impressions relative to a particular website or keyword. The CMS 106 may also determine and maintain the number of click-throughs for content as well as the ratio of click-throughs to impressions.

The CMS 106 may also allow the content providers 102 to select and/or create conversion types for content. A "conversion" may occur when a user consummates a transaction related to given content. A conversion could be defined to occur when a user clicks on content, for example a specific content item, is referred to the content provider's web page, and consummates a purchase there before leaving that web page. In another example, a conversion could be defined as the display of content to a user and a corresponding purchase on the content provider's web page within a predetermined time (e.g., seven days). The CMS 106 may store conversion data and other information in a conversion data repository 136.

The CMS 106 may allow the content providers 102 to input description information associated with content. This information could be used to assist the publishers 104 in determining content to publish. The content providers 102 may additionally input a cost/value associated with selected conversion types, such as a five dollar credit to the publishers 104 for each product or service purchased.

The CMS 106 may provide various features to the publishers 104. In some examples, the CMS 106 may include features for publishers similar to those in the AdSense™ system provided by Google Inc. The CMS 106 may deliver content (associated with the content providers 102) to the user access devices 108 when users access publications from the publishers 104. The CMS 106 can be configured to deliver content that is relevant to publisher sites, publications, and publisher audiences.

In some examples, the CMS 106 may crawl publications provided by the publishers 104 and deliver content that is relevant to publisher sites, publications and publisher audiences based on the crawled publications. The CMS 106 may also selectively recommend and/or provide content based on user information and behavior, such as particular search queries performed on a search engine website, or a designation of content for subsequent review, as described herein, etc. The CMS 106 may store such information in a general database 146. In some examples, the CMS 106 can add search services (e.g., a Google™ search box) to a publisher site and deliver content configured to provide appropriate and relevant content relative to search results generated by requests from visitors of the publisher site. A combination of these and other approaches can be used to deliver relevant content.

The CMS 106 may allow the publishers 104 to search and select specific products and services as well as associated content to be displayed with publications provided by the publishers 104. For example, the publishers 104 may search through content in the content repository 126 and select certain content for display with their publications.

The CMS 106 may be configured to selectively recommend and provide content created by the content providers 102 to the user access devices 108 directly or through the publishers 104. The CMS 106 may selectively recommend and provide content to a particular publisher 104 (as described in further detail herein) or a requesting user access device 108 when a user requests search results or loads a publication from the publisher 104.

In some implementations, the CMS 106 may manage and process financial transactions among and between elements in the environment 100. For example, the CMS 106 may credit accounts associated with the publishers 104 and debit accounts of the content providers 102. These and other transactions may be based on conversion data, impressions information and/or click-through rates received and maintained by the CMS 106.

"Computing devices", for example user access devices 108, may include any devices capable of receiving information from the network 110. The user access devices 108 could include general computing components and/or embedded systems optimized with specific components for performing specific tasks. Examples of user access devices include personal computers (e.g., desktop computers), mobile computing devices, cell phones, smart phones, head-mounted computing devices, media players/recorders, music players, game consoles, media centers, media players, electronic tablets, personal digital assistants (PDAs), television systems, audio systems, radio systems, removable storage devices, navigation systems, set top boxes, other electronic devices and the like. The user access devices 108 can also include various other elements, such as processes running on various machines.

The network 110 may include any element or system that facilitates communications among and between various network nodes, such as elements 108, 112, 114 and 116. The network 110 may include one or more telecommunications networks, such as computer networks, telephone or other communications networks, the Internet, etc. The network 110 may include a shared, public, or private data network encompassing a wide area (e.g., WAN) or local area (e.g., LAN). In some implementations, the network 110 may facilitate data exchange by way of packet switching using the Internet Protocol (IP). The network 110 may facilitate wired and/or wireless connectivity and communication.

For purposes of explanation only, certain aspects of this disclosure are described with reference to the discrete elements illustrated in FIG. 1. The number, identity and arrangement of elements in the environment 100 are not limited to what is shown. For example, the environment 100 can include any number of geographically-dispersed content providers 102, publishers 104 and/or user access devices 108, which may be discrete, integrated modules or distributed systems. Similarly, the environment 100 is not limited to a single CMS 106 and may include any number of integrated or distributed CMS systems or elements.

Furthermore, additional and/or different elements not shown may be contained in or coupled to the elements shown in FIG. 1, and/or certain illustrated elements may be absent. In some examples, the functions provided by the illustrated elements could be performed by less than the illustrated number of components or even by a single element. The illustrated elements could be implemented as individual processes running on separate machines or a single process running on a single machine.

Figure 2:
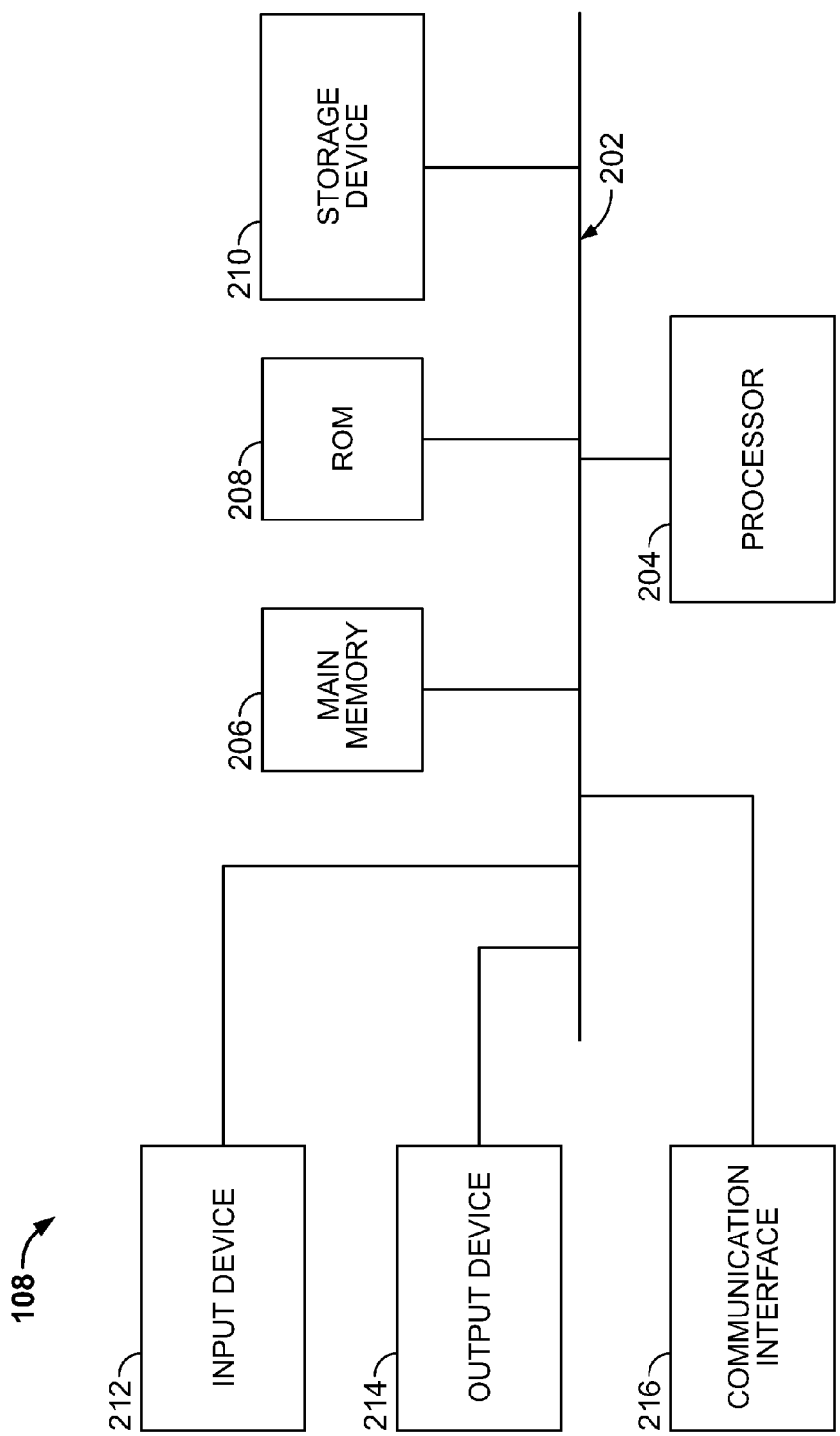

FIG. 2 is a block diagram of a computing device, for example a user access device 108 (FIG. 1). Computing device 108 may include a bus 202, a processor 204, a main memory 206, a read only memory (ROM) 208, a storage device 210, an input device 212, an output device 214, and a communication interface 216. Bus 202 may include a path that permits communication among the components of computing device 108.

Processor 204 may include any type of conventional processor, microprocessor, or processing logic that interprets and executes instructions. Main memory 206 may include a random access memory (RAM) or another type of dynamic storage device that stores information and instructions for execution by processor 204. ROM 208 may include a conventional ROM device or another type of static storage device that stores static information and instructions for use by processor 204. Storage device 210 may include a magnetic and/or optical recording medium and its corresponding drive.

Input device 212 may include a conventional mechanism that permits computing device 108 to receive commands, instructions, or other inputs from a user 150, 152, or 154, including visual, audio, touch, button presses, stylus taps, etc. Additionally, input device may receive location information. Accordingly, input device 212 may include, for example, a camera, a microphone, one or more buttons, a touch screen, and/or a GPS receiver. Output device 214 may include a conventional mechanism that outputs information to the user, including a display (including a touch screen) and/or a speaker. Communication interface 216 may include any transceiver-like mechanism that enables computing device 108 to communicate with other devices and/or systems. For example, communication interface 216 may include mechanisms for communicating with another device or system via a network, such as network 110 (FIG. 1).

As described herein, computing device 108 facilitates the presentation of publications from one or more publishers, along with one or more content items to a user. Computing device 108 may perform these and other operations in response to processor 204 executing software instructions contained in a computer-readable medium, such as memory 206. A computer-readable medium may be defined as a physical or logical memory device and/or carrier wave. The software instructions may be read into memory 206 from another computer-readable medium, such as data storage device 210, or from another device via communication interface 216. The software instructions contained in memory 206 may cause processor 204 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

Figure 3:
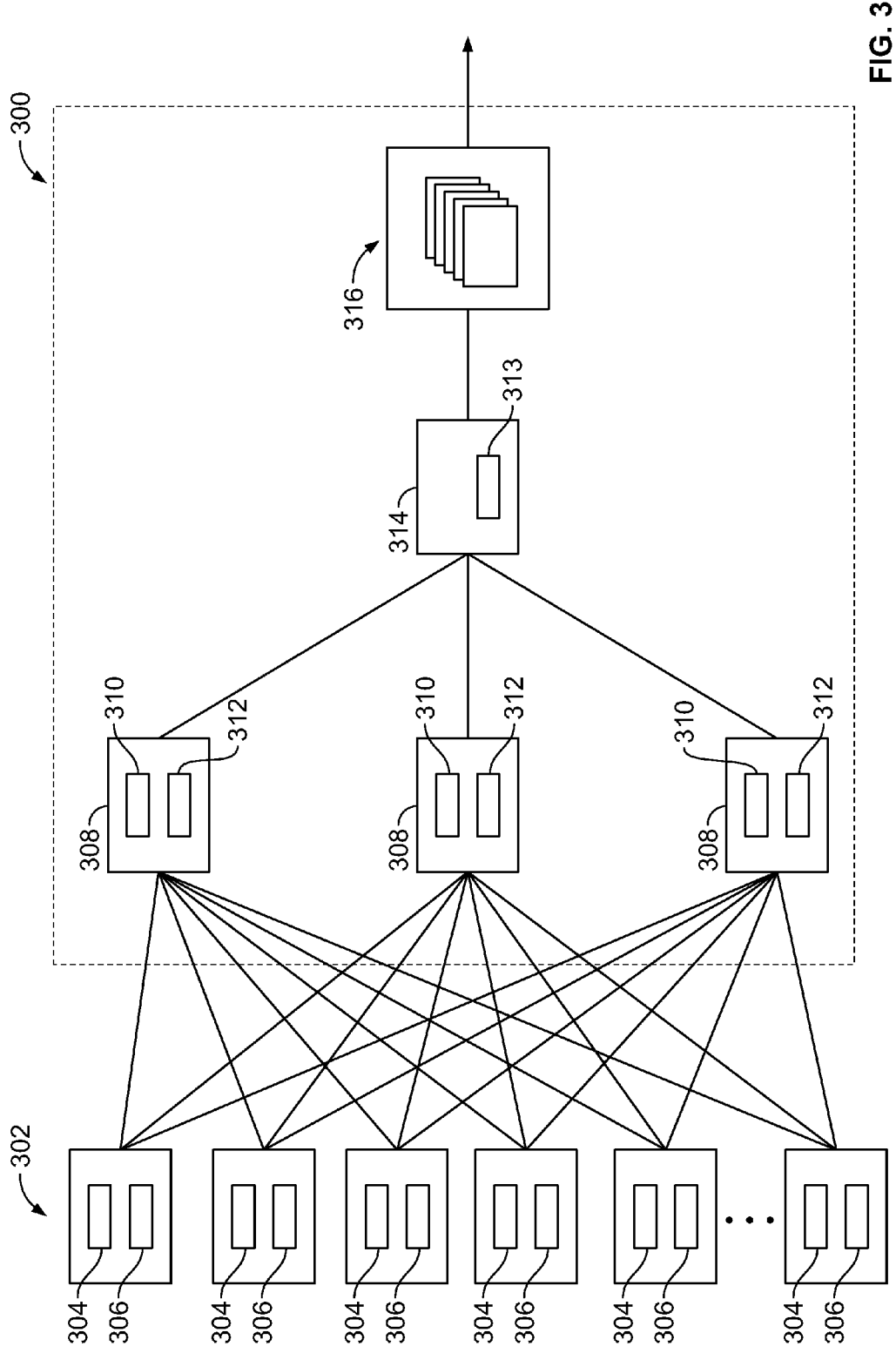

FIG. 3 is a data flow diagram of a system 300 for automatically determining the visual appeal of online content. In the example embodiment, system 300 receives one or more generated online content 302. Each content item 302 includes textual content 304 and/or graphic content 306 including, for example, identifiable objects, color gradients and abstract shapes. Textual content 304 and graphic content 306 are described by respective parameters. For example, textual content 304 is described by textual content parameters including, for example, but not limited to, a relative size of the font with respect to other textual content, a location of the textual content, a location of breaks used in text wrapping in the textual content, text character bold, italics, and CAPS, use of white space, a relative alignment of the textual content and other design elements, and a readability of the textual content based on the font colors and background colors or image. In various embodiments, graphic content 306 is described by, for example, but not limited to, an identification of each of one or more graphic objects, a size of the graphic objects, a color of the graphic objects, an orientation of the graphic objects, and an indication of whether each object is in the foreground or background with respect to each other graphic object. An identification of the object is what the object is, for example, a horse, a house, a car, a hot-air balloon are examples of the identification of the object.

In various embodiments, the determined parameters relate to the semantics of the objects or combinations of the objects in the graphics. The determined parameters may also relate to the semantics of the semantics of the textual content, where the semantics include meaning, emotion, feeling, memories.

The online content is directed to one or more algorithms 308 configured to apply one or more rules 310 to the received online content. Rules 310 are programmed to capture the knowledge of human subject matter experts. Each of one or more algorithms 308 may focus on a particular aspect of the online content and its compliance with rules 310 embodied in respective algorithms 308. The one or more rules are capable of recognizing graphic content parameters, recognizing textual content parameters, and relating graphic content parameters and textual content parameters to a set of desired parameters 312 accessible to the one or more rules. As described above, the parameters generally relate to the appearance of the graphic content and the textual content. The rules also are used to determine a location of the graphic content and textual content with respect to other graphic content and textual content in the content item, a font type, and a font color in which each of the textual content is rendered.

The determined graphic content parameters and determined textual content parameters of the received online content are compared to the set of desired parameters. The comparison includes a definition of incompatible combinations of parameters and a definition of acceptable combinations of parameters. Moreover, based on font palettes, a fit of the text in the online content using one or more font-fitting algorithms 313 is evaluated. The comparisons are used by a comparison module 314 to rank the online content. The ranked online content 316 is output from system 300 for further evaluation and/or processing. Although illustrated as a part of comparison module 314, font-fitting algorithms 313 may be a part of algorithms 308 or other part of system 300.

Figure 4:
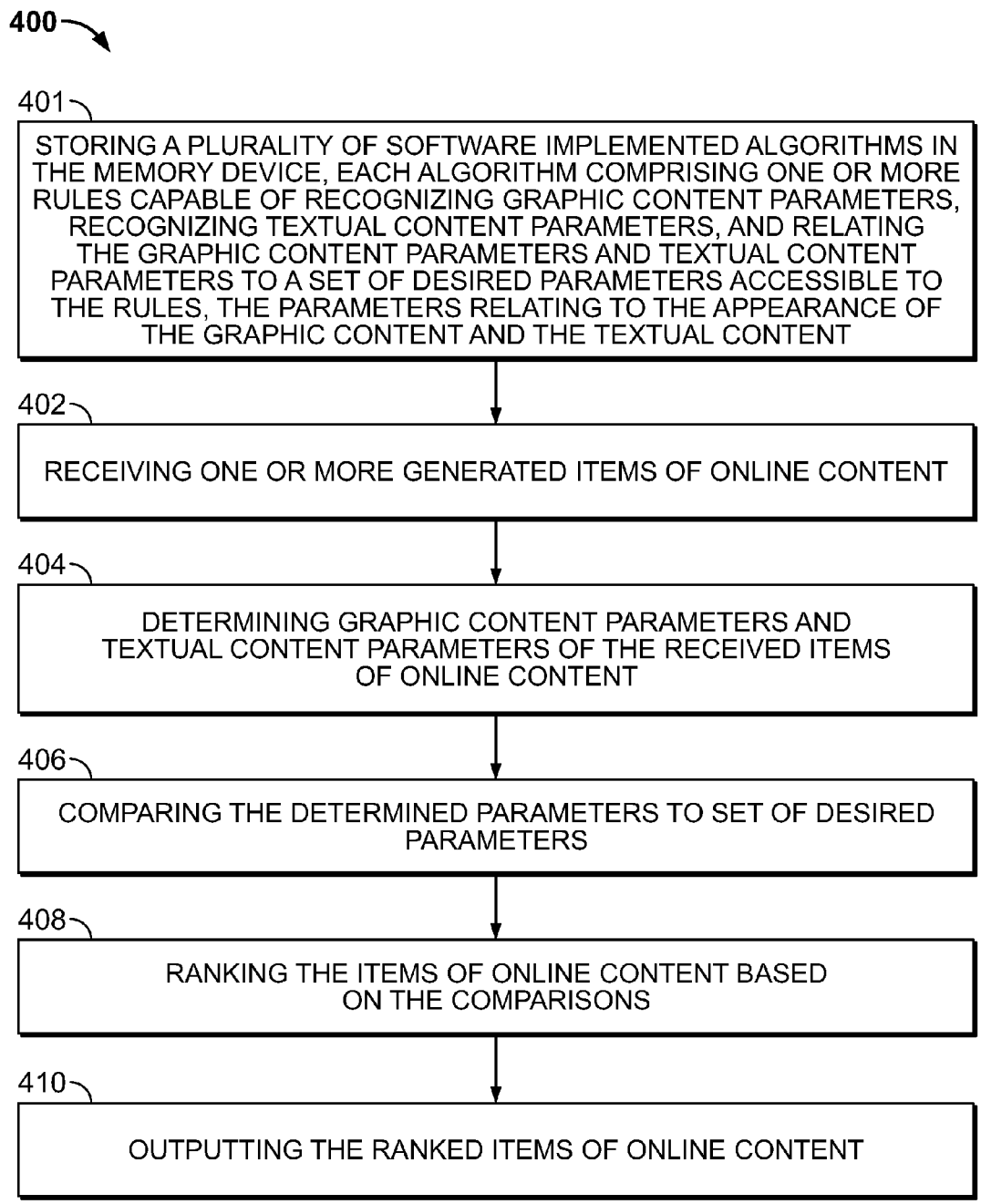

FIG. 4 is a flowchart of a method 400 for automatically determining the visual appeal of online content items, such as, but not limited to, advertisements. In the example embodiment, method 400 includes storing 401 a plurality of software implemented algorithms in the memory device, receiving 402 one or more generated online content, determining 404 graphics and textual content parameters of the received online contents, comparing 406 the determined parameters to the set of desired parameters, ranking 408 the online content item based on the comparisons, and outputting 410 the ranked content item.

The plurality of stored 401 software implemented algorithms include one or more rules capable of recognizing graphic content parameters, recognizing textual content parameters, and relating the graphic content parameters and the textual content parameters to a set of desired parameters accessible to the rules. The parameters relate to the appearance of the graphic content and the textual content. The appearance of the content relates to how successful the content is at conveying a message, such as a message that is contained in a content item. The appearance may have qualities of boldness or subtleness, may contrast with surrounding online content or be complementary to it. The rules are programmed to focus on different aspects of what makes a successful content item and recognize those aspects within received 402 online content supplied to the rules.

The graphics and textual content parameters of the received online contents are determined 404 by the each of the algorithms. Each algorithm parses the content according to the rules contained in the particular algorithm. Accordingly, each algorithm is expected to determine a different set of parameters for the same online content. The determined parameters are compared 406 the determined parameters to the set of desired parameters, which are also stored in the memory device. The desired parameters are used with the rules to capture the knowledge of human designers and, with the rules, are applied to the determined parameters of the received online content. The items of online content, for example advertisements, are ranked 408 based on the comparisons and the ranked online content is then outputted 410 for further evaluation or processing. Because the rules and desired parameters reflect the knowledge of human designers, the online content can be ranked in order of its compliance with the rule and desired parameters.

Figure 5:
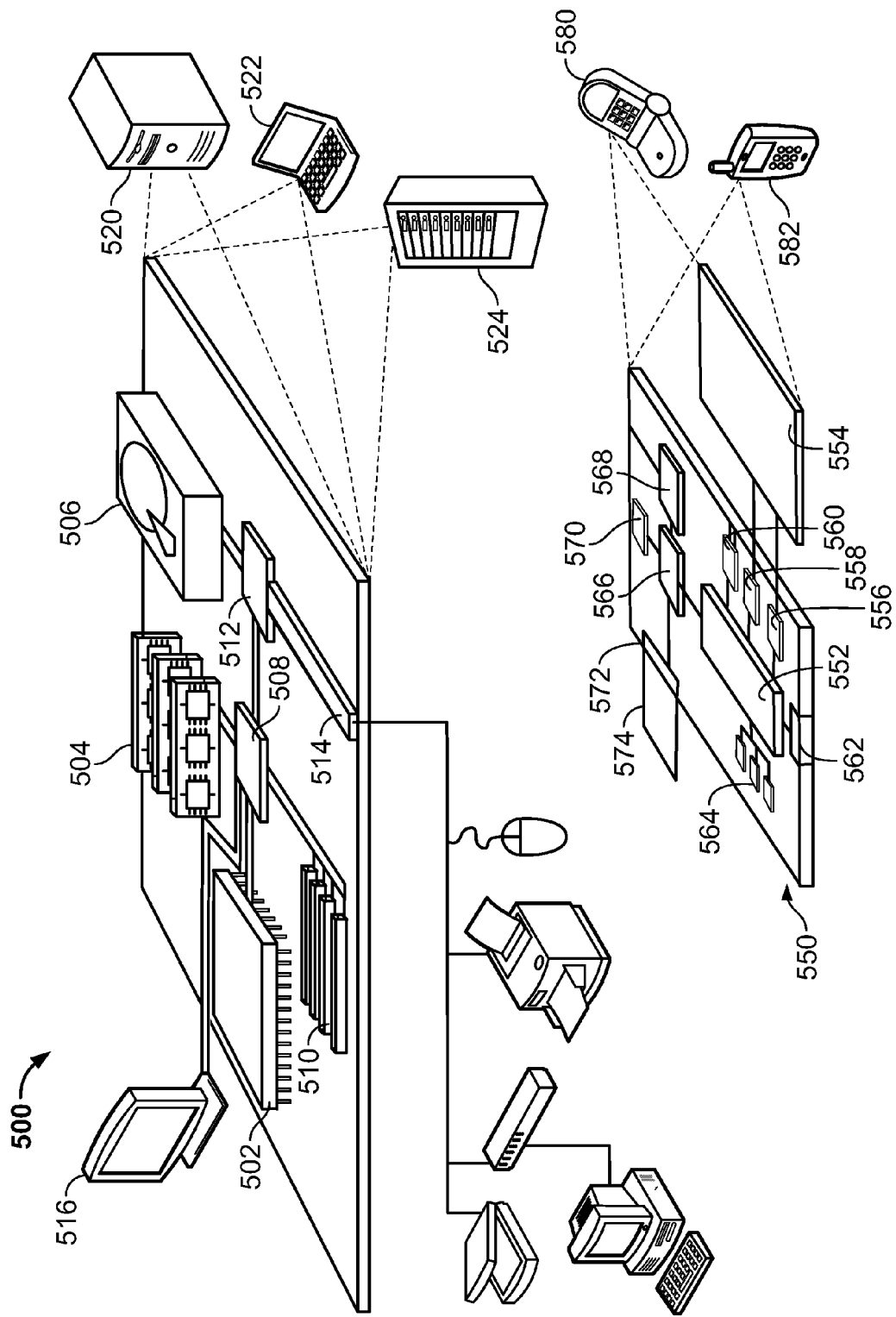

FIG. 5 is a diagram of example computing devices 500 and 550 that may be used in the environment shown in FIG. 1. More specifically, FIG. 5 shows an example of a generic computing device 500 and a generic mobile computing device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be examples only, and are not meant to limit implementations of the inventions described and/or claimed in this document.

Computing device 500 includes a processor 502, a memory 504, a storage device 506, a high-speed interface/controller 508 connecting to memory 504 and high-speed expansion ports 510, and a low speed interface/controller 512 connecting to a low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed buss 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as computing device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The computing device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the computing device 550, such as control of user interfaces, applications run by computing device 550, and wireless communication by computing device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of computing device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to computing device 550 through expansion interface 572, which may include, for example, a SIMM (Single In Line Memory Module) card interface. Such expansion memory 574 may provide extra storage space for computing device 550, or may also store applications or other information for computing device 550. Specifically, expansion memory 574 may include instructions to carry out or supplement the processes described above, and may include secure information also. Thus, for example, expansion memory 574 may be provide as a security module for computing device 550, and may be programmed with instructions that permit secure use of computing device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Computing device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, Wi-Fi, or other such transceiver (not shown). In addition, GPS (Global Positioning system) receiver module 570 may provide additional navigation- and location-related wireless data to computing device 550, which may be used as appropriate by applications running on computing device 550.

Computing device 550 may also communicate audibly using audio codec 560, which may receive spoken information from a user and convert it to usable digital information. Audio codec 560 may likewise generate audible sound for a user, such as through a speaker, e.g., in a handset of computing device 550. Such sound may include sound from voice telephone calls, may include recorded sound (e.g., voice messages, music files, etc.) and may also include sound generated by applications operating on computing device 550.

The computing device 550 may be implemented in a number of different forms, as shown in the figure. For example, it may be implemented as a cellular telephone 580. It may also be implemented as part of a smart phone 582, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, computing systems 500 and 552 are configured to receive and/or retrieve data pertaining to the creation, review and revision of online content items; data regarding content item providers, content item links or impressions corresponding to those content item providers that appear on a web page, and metrics corresponding to the appearance of those impressions on that web page, etc., from various other computing devices connected to computing devices 500 and 552 through a communication network, and store this data within at least one of memory 504, storage device 506, and memory 564. Computing systems 500 and 552 are further configured to manage and organize the data within at least one of memory 504, storage device 506, and memory 564 using the techniques described herein.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 117, 502, 552 including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is one or more of (a) storing a plurality of software implemented algorithms in the memory device, (b) receiving one or more generated items of online content, (c) determining graphics and textual content parameters of the received items of online content, (d) comparing the determined parameters to the set of desired parameters, (e) ranking the items of online content based on the comparisons, and (f) outputting the ranked items of online content. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for automatically determining a visual appeal of online content, the method implemented using a visual appeal determination computing device coupled to a user interface and a memory device, the method comprising:

storing, by the visual appeal determination computing device, a plurality of software implemented algorithms in the memory device, each algorithm comprising one or more rules representing expert knowledge for subject matter of online content items, the rules are capable of recognizing graphic content parameters, recognizing textual content parameters, and relating the graphic content parameters and the textual content parameters to a set of desired parameters accessible to the rules based on the expert knowledge, the parameters relating to the appearance of the graphic content and the textual content, each algorithm pertains to a different aspect of online content;

receiving, by the visual appeal determination computing device, one or more generated items of online content from a content provider computing device;

determining, by the visual appeal determination computing device, graphic content parameters and textual content parameters of the received items of online content by parsing the online content using the plurality of algorithms according to the different rules included in each algorithm, determining the graphic content parameters and textual content parameters include determining a relative size of a font with respect to other textual content, a location of the textual content within the content item, a location of breaks used in text wrapping in the textual content, a relative alignment of the textual content, a readability of the textual content based on font colors and background colors, and an orientation of graphic objects within the content item;

comparing, by the visual appeal determination computing device, the determined parameters to the set of desired parameters by determining whether each aspect meets a respective predefined threshold value;

ranking, by the visual appeal determination computing device, the items of online content based on the comparisons; and providing guidance for improving a quality of the items of online content by outputting, by the visual appeal determination computing device, the ranked items of online content to the content provider computing device.

2. The method of claim 1, wherein determining graphic content parameters and textual content parameters of the received items of online content comprises determining parameters that relate to the semantics of objects or combinations of objects identified in the graphics, including:

determining an identification of at least one object depicted in the graphic content; and determining whether each object is in a foreground or a background with respect to each other object.

3. The method of claim 1, further comprising determining a readability of textual content in at least one of the items of online content based on font colors and background colors in the at least one item of online content.

4. The method of claim 1, wherein comparing the determined parameters to the set of desired parameters comprises comparing the determined parameters to the set of desired parameters that include a first definition of acceptable combinations of parameters and a second definition of incompatible combinations of parameters.

5. The method of claim 1, wherein determining graphic content parameters and textual content parameters of the received items of online content comprises determining a graphics and textual content location with respect to other graphics and textual content in the items of online content, a font type, and a font color in which each of the texts is rendered.

6. The method of claim 1, further comprising, based on font palettes, evaluating a fit of the text in the items of online content using one or more font fitting algorithms.

7. A system for algorithmically determining a visual appeal of content items, said system comprising:

a processor; and a computer-readable memory device having encoded thereon computer readable instructions that when executed by the processor cause the processor to:

store a plurality of software implemented algorithms in the memory device, each algorithm comprising one or more rules representing expert knowledge for subject matter of online content items, the rules are capable of recognizing graphic content parameters, recognizing textual content parameters, and relating the graphic content parameters and the textual content parameters to a set of desired parameters accessible to the rules based on the expert knowledge, the parameters relating to the appearance of the graphic content and the textual content, each algorithm pertains to a different aspect of online content;

receive one or more generated items of online content from a content provider computing device;

determine graphic content parameters and textual content parameters of the received items of online content, by parsing the online content using the plurality of algorithms according to the different rules included in each algorithm, wherein determining the graphic content parameters and textual content parameters include determining a relative size of a font with respect to other textual content, a location of the textual content within the content item, a location of breaks used in text wrapping in the textual content, a relative alignment of the textual content, a readability of the textual content based on font colors and background colors, and an orientation of graphic objects within the content item;

compare the determined parameters to the set of desired parameters, by determining whether each aspect meets a respective predefined threshold value;

rank the items of online content based on the comparisons; and provide guidance for improving a quality of the items of online content by outputting the ranked items of online content to the content provider computing device.

8. The system of claim 7, wherein the computer readable instructions when executed by the processor cause the processor to determine parameters that relate to the semantics of objects or combinations of objects in the graphic content.

9. The system of claim 7, wherein the computer readable instructions when executed by the processor cause the processor to determine parameters that relate to the semantics of the textual content, where semantics include meaning, emotion, feeling, and memories.

10. The system of claim 7, wherein the computer readable instructions when executed by the processor cause the processor to compare the determined parameters to the set of desired parameters that include a definition of incompatible combinations of parameters.

11. The system of claim 7, wherein the computer readable instructions when executed by the processor cause the processor to compare the determined parameters to the set of desired parameters that include a definition of acceptable combinations of parameters.

12. The system of claim 7, wherein the computer readable instructions when executed by the processor cause the processor to determine a graphic content and textual content location with respect to other graphic content and textual content in the content item, a font type, and a font color in which each of the texts is rendered.

13. The system of claim 7, wherein the computer readable instructions when executed by the processor cause the processor to, based on font palettes, evaluate a fit of the text in the content item using one or more font fitting algorithms.

14. One or more non-transitory computer-readable storage media having computer-executable instructions embodied thereon, wherein when executed by at least one processor coupled to a memory device, the computer-executable instructions cause the processor to:

store a plurality of software implemented algorithms in the memory device, wherein each algorithm includes one or more rules representing expert knowledge for subject matter of online content items, the rules are capable of recognizing graphic content parameters, recognizing textual content parameters, and relating the graphic content parameters and the textual content parameters to the set of desired parameters accessible to the rules based on the expert knowledge, the parameters relating to the appearance of the graphic content and the textual content, each algorithm pertains to a different aspect of online content;

receive one or more generated items of online content from a content provider computing device;

determine graphic content parameters and textual content parameters of the received items of online content, by parsing the online content using the plurality of algorithms according to the different rules included in each algorithm, wherein determining the graphic content parameters and textual content parameters include determining a relative size of a font with respect to other textual content, a location of the textual content within the content item, a location of breaks used in text wrapping in the textual content, a relative alignment of the textual content, a readability of the textual content based on font colors and background colors, and an orientation of graphic objects within the content item;

compare the determined parameters to the set of desired parameters by determining whether each aspect meets a respective predefined threshold value;

rank the items of online content based on the comparisons; and provide guidance for improving a quality of the items of online content by outputting the ranked items of online content to the content provider computing device.

15. The non-transitory computer-readable storage media of claim 14, wherein the computer readable instructions when executed by the at least one processor cause the at least one processor to determine parameters that relate to the semantics of objects or combinations of objects in the graphic content.

16. The non-transitory computer-readable storage media of claim 14, wherein the computer readable instructions when executed by the at least one processor cause the at least one processor to determine parameters that relate to the semantics of the textual content, where semantics include meaning, emotion, feeling, and memories.

17. The non-transitory computer-readable storage media of claim 14, wherein the computer readable instructions when executed by the at least one processor cause the at least one processor to compare the determined parameters to the set of desired parameters that include a definition of incompatible combinations of parameters.

18. The non-transitory computer-readable storage media of claim 14, wherein the computer readable instructions when executed by the at least one processor cause the at least one processor to compare the determined parameters to the set of desired parameters that include a definition of acceptable combinations of parameters.

19. The non-transitory computer-readable storage media of claim 14, wherein the computer readable instructions when executed by the at least one processor cause the at least one processor to determine a graphic content and textual content location with respect to other graphic content and textual content in the content item, a font type, and a font color in which each of the texts is rendered.

* * * * *